Sept. 9, 1969 C. S. OCHS 3,465,878
VACUUM DETECTING APPARATUS FOR SEALED CONTAINERS
Filed March 7, 1967 4 Sheets-Sheet 1

INVENTOR.
CHARLES S. OCHS
BY
Norman M Holland
ATTORNEY

Sept. 9, 1969  C. S. OCHS  3,465,878
VACUUM DETECTING APPARATUS FOR SEALED CONTAINERS
Filed March 7, 1967  4 Sheets-Sheet 2

INVENTOR.
CHARLES S. OCHS
BY
ATTORNEY

Sept. 9, 1969  C. S. OCHS  3,465,878
VACUUM DETECTING APPARATUS FOR SEALED CONTAINERS
Filed March 7, 1967  4 Sheets-Sheet 3

INVENTOR.
CHARLES S. OCHS
BY
Norman N Hallar
ATTORNEY

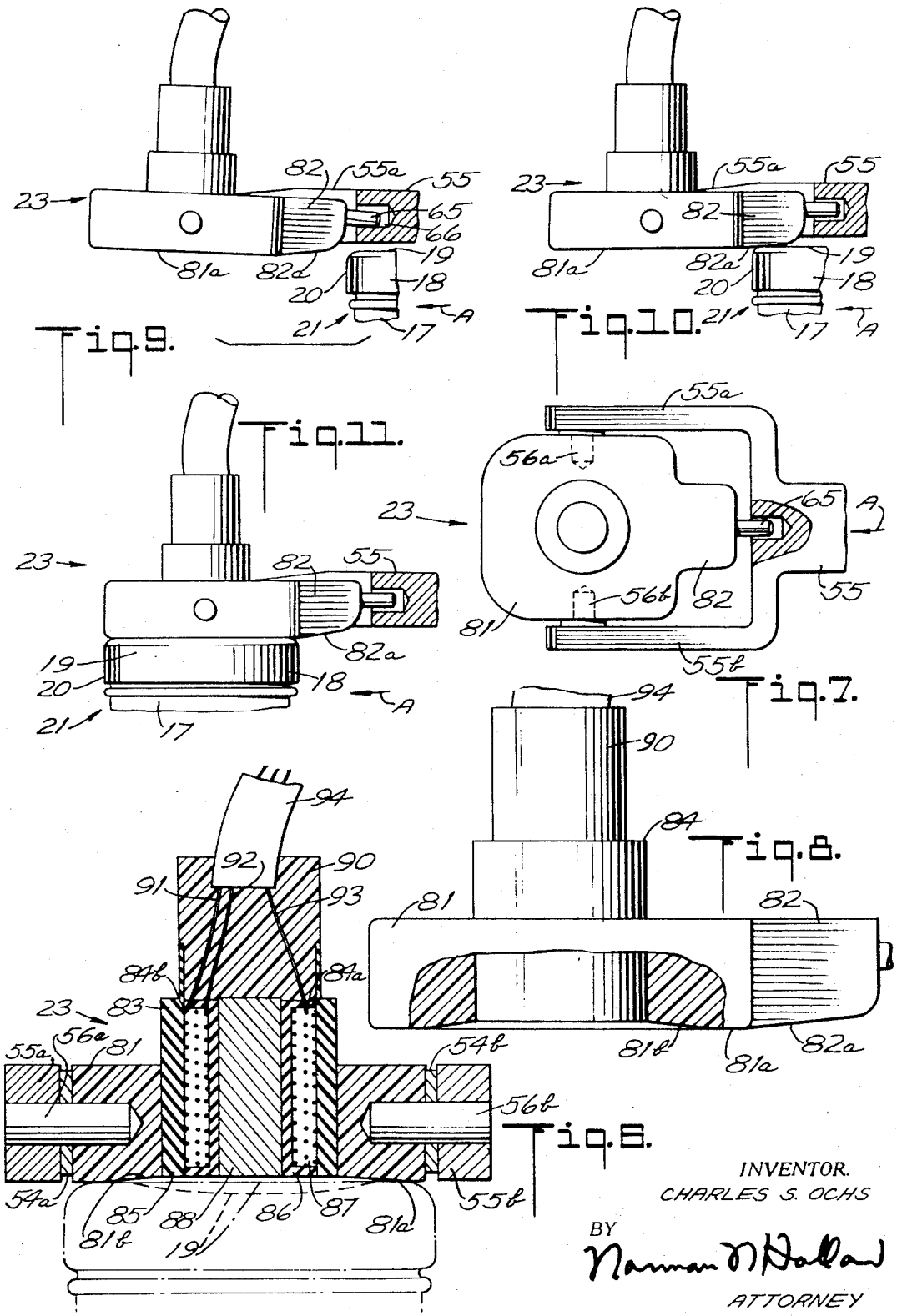

United States Patent Office 3,465,878
Patented Sept. 9, 1969

3,465,878
VACUUM DETECTING APPARATUS FOR
SEALED CONTAINERS
Charles S. Ochs, Lancaster, Ohio, assignor to Anchor
Hocking Glass Corporation, Lancaster, Ohio, a corporation of Delaware
Filed Mar. 7, 1967, Ser. No. 621,281
Int. Cl. B07c 5/08
U.S. Cl. 209—80                                    15 Claims

ABSTRACT OF THE DISCLOSURE

A plastic sensing device has a coil of the air core type for inspecting the top panels of closures having good electrical conductive characteristics to determine if a proper vacuum has been formed. The sealed containers or packages on a conveyor are moved successively beneath the sensing device for inspection. Mounting means supports the sensing device with a limited universal movement of the sensing device to seat evenly on the closure over deviations of the closure from the horizontal.

Background of the invention

This invention relates to the inspection of the top panels of sealing closures and is directed particularly to sensing devices and supports for sensing devices.

It is well known that closures for containers have a top panel which flexes downwardly when a vacuum is present in the container and is flat or convex upwardly when a vacuum is not present. The containers with the closures are carried on a conveyor underneath a sensing device for inspection. Various types of sensing devices have been used to automatically determine the configuration of the closure. These devices must respond to the panel in a non-vacuum condition and not respond to a depressed top panel or to the edge of the cap.

Prior sensing devices have included feeling fingers physically engaging the top panel, proximity devices, Hall type probes, reluctance sensing elements and the like. These have been supported in many different ways. The support for the sensing device may have rollers, wheels or the like engaging the closure to lift the sensing device or to pivot the wheels and sensing device about a horizontal supporting shaft extending transverse to the direction of movement. The sensing device is thus spaced a prescribed distance above the panel.

In addition to the sensing device being properly positioned above the top panel, the packages should be moved rapidly through the inspection so that a large quantity may be checked. The sensing devices must operate quickly and positively each time to a raised panel without passing any duds as acceptable.

Summary of the invention

The invention is on a highly sensitive sensing device having a coil of the air core type as the sensing element mounted in nonmagnetic material and supported to universally adjust to the angle of the top of the closures over limited arcs.

The sensing device is made essentially of electrically nonconductive material and has drive and feedback coils connected to an electronic component. The electronic component supplies a high frequency current to the drive coil in the order of 16 to 24 kilocycles per second. The closure on the container is made of a good conductive material, such as metal, and is moved under the sensing device by a conveyor. The drive coil and the feedback coil are inductively coupled and the high frequency flux induces eddy currents which vary the loading of the coils on the electronic component. This produces a signal when the loading exceeds a given amount indicating a raised panel and an unacceptable vacuum.

An object of the invention is to provide a sensing device for inspecting closures that is responsive to closures of electrically conductive material and is highly sensitive to small differences in the position of the top panels of the closures.

Another object of the invention is to provide a mounting for adjustably supporting said sensing device to tilt with the top panels.

Another object of the invention is to provide a sensing device that is highly sensitive to small differences in panel positions and unresponsive to the edge portion of the closures.

Other and further objects of the invention will be obvious on an understanding of the illustrative embodiment about to be described, or will be indicated in the appended claims, and various advantages not referred to herein will occur to one skilled in the art upon employment of the invention in practice.

Brief description of the drawings

FIG. 6 is an enlarged sectional view of the sensing device taken along lines 6—6 of FIG. 3.

FIG. 7 is a bottom view of the sensing device.

FIG. 8 is a side view of the sensing device shown partly in section.

FIGS. 9 through 11 illustrate the relationship of the sensing device and the container closure as the package moves into the inspecting position.

Detailed description

Figure 2:
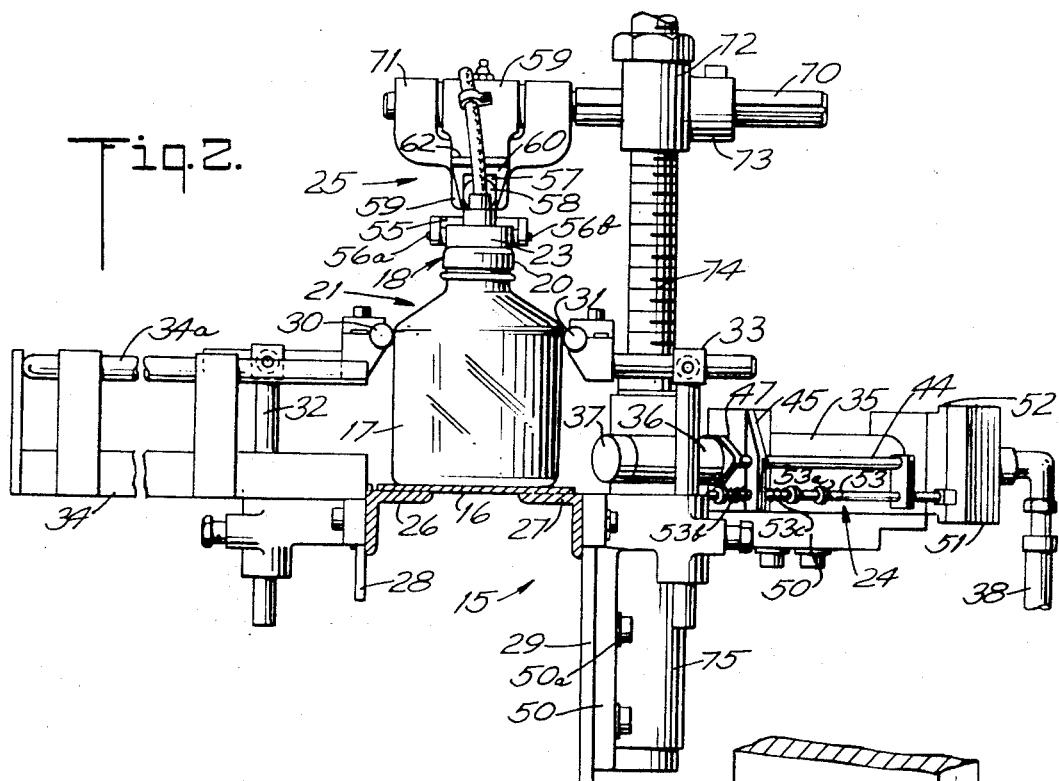
FIG. 2 is a sectional view of the inspection apparatus along lines 2—2 of FIG. 3.

Referring to FIGS. 1 to 4, the inspecting apparatus has a frame 15 with a conveyor 16 for linearly moving packages 21 beneath a sensing device 23 and past a package rejection mechanism 24 in the direction indicated by the arrow A. The packages have a closure 18 with a top panel 19 and a skirt 20 securing the closure to the container 17. The top panel may be concave, as illustrated by the dash lines, or flat, as illustrated by the dot dash lines in FIG. 6. The sensing device is adjustably supported by the mounting means 25 secured to the frame 15 in a manner later described herein.

The frame 15 is conventional and is only partially shown in the drawings. The frame has a front panel 29 (FIGS. 2–4) secured to the L-shaped beam 27 (FIGS. 2 and 4) along the upper edge of the front panel. The L-shaped beams 26, 27 support the conveyor 16. Guide rails 30 and 31 are vertically and horizontally adjustable in the supports 32, 33 (FIG. 2) fastened to the L-shaped beams respectively (FIG. 2). The guide rails 30 and 31 center the packages 21 to move under the sensing device 23 (FIG. 2).

The rejection mechanism 24 is mounted on an L-shaped support 50 (FIG. 4) secured to the front panel 29 by the bolts 50a. The mechanism comprises an air cylinder 35 (FIGS. 2 and 3) reciprocally actuating a pusher 36 having a resilient cushion 37 on the tip for engaging the containers.

Figures 3, 5:
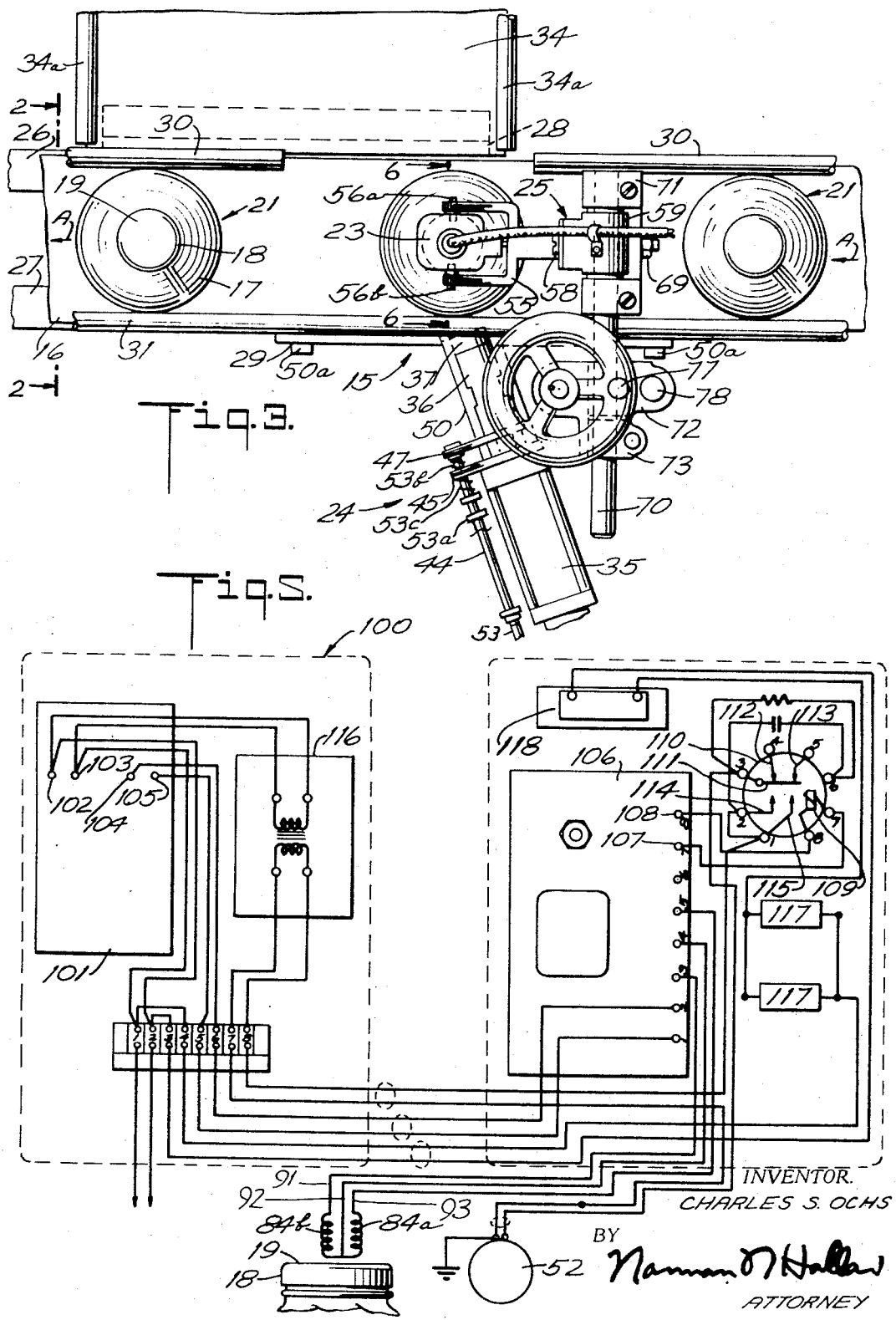
FIG. 3 is a top view of the inspecting apparatus illustrating the inspection of a closure.
FIG. 5 is a diagrammatic illustration of the electrical circuit connected to the sensing device.
Figure 4:
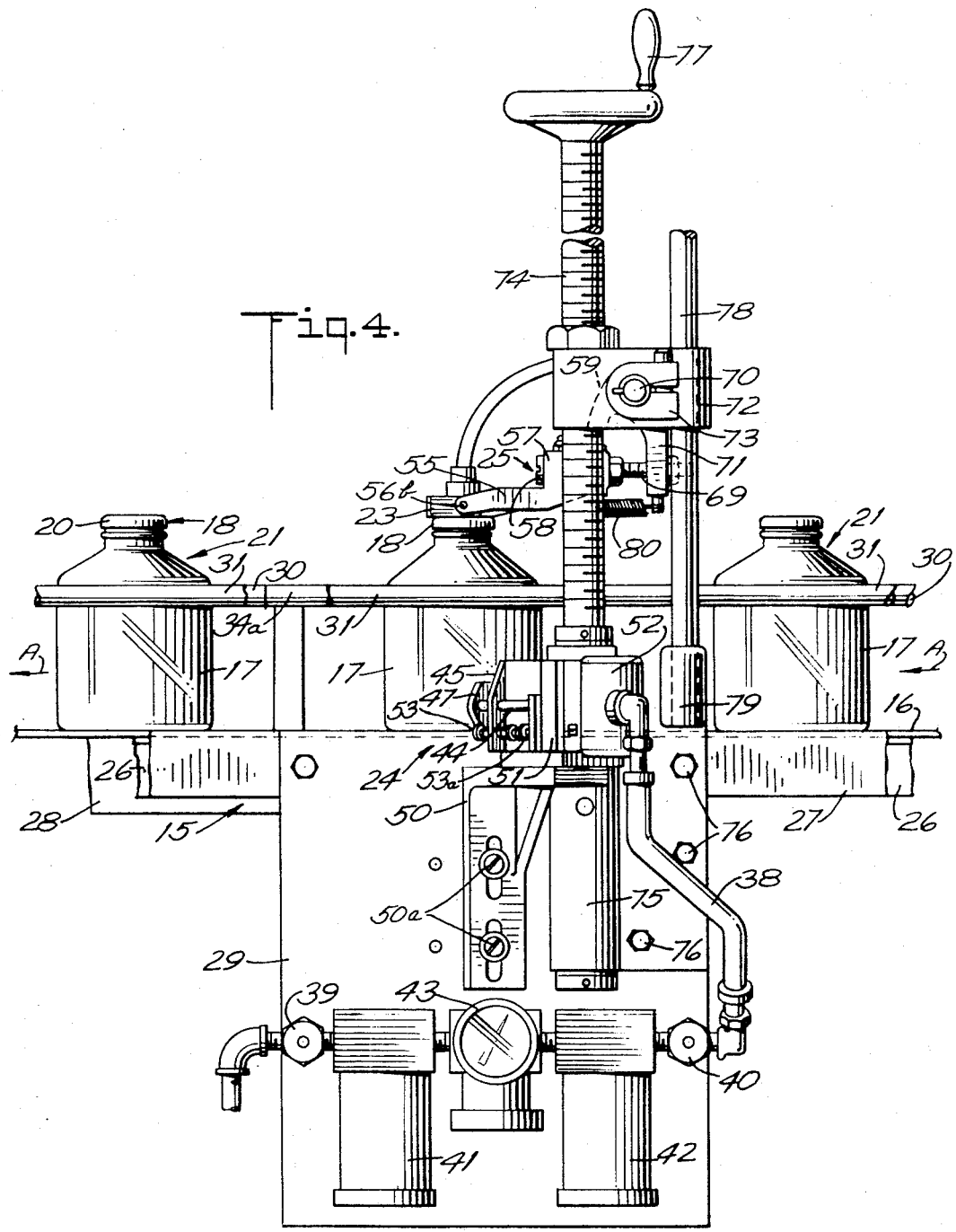
FIG. 4 is a side view of the inspecting apparatus with the sensing device in the inspecting position.

Air pressure is supplied to the electrically operated valve 52 (FIGS. 2 and 4) by the conduit 38 through the filter 41, pressure indicator 43 and lubricator 42 (FIG. 4). The air valve 52 controls the air supplied to the air cylinder 35. On detection of a package without a proper vacuum the air valve 52 is opened by the electrical component illustrated in FIG. 5 and the pusher 36 forces the unacceptable package off of the conveyor 16 (FIG. 3) onto the platform or tray 34 mounted on the support 28 secured to beam 26. The tray is at the same level as the conveyor 16 and extends perpendicular thereto. The guide rail 30 is interrupted at the rejection platform and the rails 34a guide and hold the rejected packages on the platform 34. The rejected packages are manually removed. The rejection mechanism is at an acute angle to the conveyor on the side of approach of the packages and the platform 34 is positioned slightly off center in the direction of discharge.

The pusher 36 is returned to the retracted position by the mechanically operated slide valve 51 to the side of the air valve 52 (FIGS. 2–4). The valve is actuated by the pusher 36. The valve 51 has an actuating rod 53 slideably mounted in the valve and in the flange 45 at the front of the air cylinder. Springs 53b and 53c center the rod 53. A rod 44, slideably mounted in the flange 45 and connected to the pusher 36 by the flange 47, engages a collar 53a on the rod 53 to actuate the valve 51 when the pusher approaches the extended package rejecting position. Thus after the unacceptable package is pushed onto the tray 34 the continued movement of the pusher 36 actuates the valve 51 to return the pusher 36 to its initial retracted position for rejection of the next unacceptable package detected by the sensing device 23.

Figure 1:
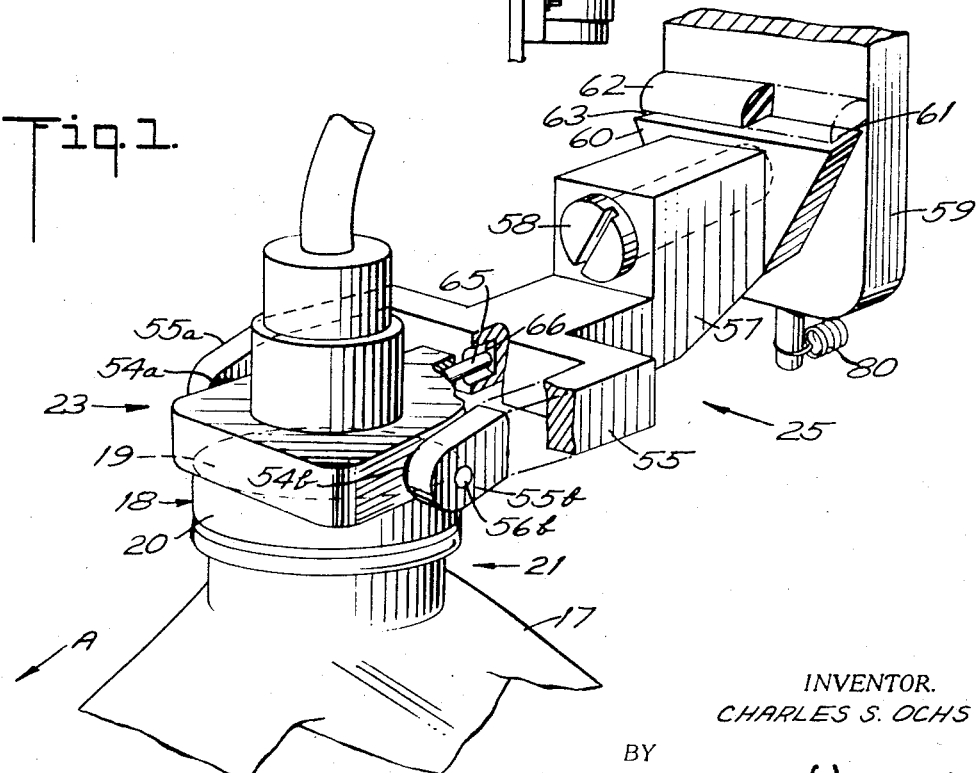
FIG. 1 is a fragmentary perspective view of the sensing device and universal mounting with the sensing device in the inspecting position.

The mounting means 25 comprises a yoke 55 pivotally supporting the sensing device 23 through the stub shafts 56a, b mounted in arms 55a, 55b (FIGS. 1 and 6). Washers 54a, b are provided between the arms and the sensing device. The yoke 55 has a mounting portion 57 (FIGS. 1, 2 and 4) with a pin or bolt 58 extending therethrough for pivotally securing the yoke to the arm 59. Triangular shaped stop portion 60 (FIG. 1) on the yoke has a flat surface 61 engaging the projection 62 on the arm 59. A limited spacing 63 is provided between the stop portion 60 and the projection 62 so as to restrict the pivoting of the yoke 55 to a few degrees. Similarly the sensing device 23 has a pin 65 (FIGS. 1, 9–11) projecting into a slot 66 in the yoke member. The slot 66 has a greater vertical dimension than the diameter of the pin 65 to permit the sensing device 23 to rock slightly in the yoke. Thus the sensing device has a limited universal action.

The arm 59 is pivotally mounted on the horizontal shaft 70 (FIGS. 2–4). A bracket 71 is securely fastened in a non-rotatable relation to the shaft 70 and extends downwardly to support an adjustable stop 69 for the pivotally mounted arm 59 to limit the lower vertical position of the yoke 55. The shaft 70 is mounted in a supporting block 72 having a clamping portion 73 for locking the shaft 70 against rotation and in horizontal position. The block 72 is mounted on the threaded shaft 74 which is threaded in and supported by the sleeve support 75 secured to the front panel 29 by the bolts 76 (FIG. 4). A handle 77 (FIGS. 3–4) is provided for rotating the threaded shaft 74 to adjust the height of the sensing device 23. A guide rod 78 is mounted in the boss 79 (FIG. 4) on the panel 29 of the frame 15 and extends vertically through the supporting block 72 to prevent rotation of the supporting block with the rotation of the shaft 74 and linearly guide the vertical movement of the block 72. A spring 80 is connected to the arm 59 and the bracket 71 to return the sensing device 23 to the lower position and provide a spring bias on the sensing device engaging the closure (FIG. 4).

The sensing device 23 has a rectangular shaped block 81 with a projection 82 facing in the direction of approach of the packages 21 (FIG. 7). The pin 65 is mounted in the projection 82 and the supporting stub shafts 56a, b are fixedly mounted in the arms 55a, b of the yoke 55 (FIG. 6). The casing 83 containing the sensing coils 84 extends through the block 81. The casing 83 has an outer cylindrical part 85 and an inner U-shaped annular part 86 forming the chamber 87 for the coils 84a, b. The casing 83 is made of plastic, preferably of an epoxy type. The block 81 and a center core member 88 may be made of nylon, Delrin or similar material. "Delrin" is a trademark for a thermoplastic acetal resin. A cylindrical supporting member 90 is attached to the casing 83 and supports the leads 91, 92, 93. Leads 91, 92 and 93 are in the conduit member 94 and extend through the member 90 for connection to the coils 84a, b (FIG. 6). The block 81 has a planar lower or bottom surface 81a and a slight frusto-conical cutout portion 81b to recess the coil. Epoxy may be used to fill in the recess (FIGS. 6 and 8).

The block 81, projection 82, casing 83 and member 90 are made of plastic material of substantially greater resistance than metal. The yoke 55 is made of aluminum. The coils 84a, 84b are of the type in which the core material is nonmagnetic and nonconductive. The closure is of a conductive material. The high frequency flux of the drive coil 84a induces eddy currents in the closure.

As illustrated in FIG. 5 the electrical component 100 comprises a constant voltage transformer 101 having input terminals 102, 103 connected to a current source. The output terminals 104, 105 of the transformer are connected to an electronic component 106 for supplying power thereto. The component 106 may be the model 100 Electronic Circuit manufactured by the Micro Switch Division of Minneapolis Honeywell Regulator Company. The electronic component 106 produces a high frequency current and is connected to the coils 84a, b by the leads 91, 92 and 93 for impressing the high frequency current thereon and feeding back the change in load on the sensing of a conductive closure in a manner later described herein. On sensing of a raised panel a signal is produced at the output terminals 107, 108. The output terminals 107, 108 of the electronic component are connected to the coil and core assembly 109 of a relay 110 which shifts the movable contact 111 of the relay from one set of fixed contacts 112, 113 to a second set of fixed contacts 114, 115 on receiving a sensing signal from the electronic component.

The air valve 52 (FIGS. 2, 4) is connected to the current source through the step-down transformer 116 and the relay 110 in series with the transformer. The air valve 52 is connected to the movable contact 111 and the transformer 116 (FIG. 5). The movable contact 111 is normally in the open or disconnect position. On the sensing of an improperly sealed package the relay 110 is actuated moving the contact 111 into engagement with the energized contacts 114, 115 and connecting the air valve to the ten volt input. The valve is opened and air provided to the cylinder 35 to actuate the rejection pusher 36. Heaters 117 and a thermostat 118 are connected in series to the 110 volt input for maintaining the electronic elements at a constant temperature. This is to maintain the stability of operation of the electronic components. The current transformer 101 with its constant voltage output also contributes to maintaining the sensitivity of the electronic components.

The package 21 to be inspected approaches the sensing device 23 from underneath the yoke 55 (FIGS. 9 and 10). The arm 59 is held against the adjustable stop 69 mounted in the bracket 71 (FIG. 4) to position the bottom or lower surface 81a of the sensing device slightly below the top panel 19 of the closure. The arms 55a, 55b of the yoke (FIGS. 1 and 7) are bent downward so that the package can move underneath the yoke.

In FIG. 9 of the drawings the sensing device 23 is shown tilted downwardly with the pin 65 engaging the yoke at the bottom of the slot 66. The sensing device, however, could be tilted so as to engage the yoke at the upper end of the slot 66. The closure engages the guide means formed by the sloped surface or ramp 82a on the projection 82 to gradually lift the sensing device and pivot the yoke 55 about the shaft 70 (FIGS. 2–4). The closure then moves underneath the sensing device 23 and engages the bottom surface 81a. The rectangular block 81, casing 83, core member 88 and supporting member 90 form a nonconductive, nonmagnetic support means for the sensing element or coils 84a, b The yoke 55 may pivot or tilt about the pin 58 (FIG. 1) and the sensing device 23 may pivot about the stub shafts 56a, b to accommodate the sensing device to a package tilted in any direction so that the bottom surface engages the top panel 19 evenly around the entire circumference of the closure as illustrated in FIGS. 1 and 6. When the closure is centered in relation to the coils the sensing occurs and if the top panel is in the raised position a signal is produced rejecting the container.

The drive coil 84a and feedback coil 84b are inductive means inspecting the top panel of the closures. The drive coil 84a is connected to a transistor oscillator (not shown) in the component 106 and a high frequency alternating current is applied to the drive coil 84a (FIGS. 5 and 6). This produces an alternating field which couples with the feedback coil 84b. The feedback coil is connected to a transistor (not shown). The high frequency alternating magnetic field passes through the relatively high resistance plastic members forming the sensing device and through the top panel of the closure on presentation to the sensing device for inspection. The closures have good electrical conductive characteristics and may be made of metal. The high frequency alternating magnetic field also passes through these closures and produces eddy currents due to the alternating action. The eddy currents produce an eddy current magnetic field which tends to buck or load down the magnetic field of the sensing device. Due to the coupling of the magnetic field produced by the drive coil with the feedback coil, the feedback coil 84b is also affected by the change in the magnetic field produced by the presence of the closure. The feedback coil 84b is connected to a transistor (not shown) in the component 106 to amplify these differences which alters the sensitivity of the amplifier circuit within limits to provide a relay action when the reflected loading exceeds a given value indicating an unsatisfactory package. The amplifier sensitivity adjustment is capable of fine adjustment thereby permitting precise discrimination between packages having an acceptable vacuum and those where the closure panel is raised indicating an improper vacuum. This fine adjustment and sensitivity control eliminates the need for a separate package mechanical or electronic timing means. The apparatus satisfactorily operates with the high frequency current or flux in the range of 16 to 24 kilocycles per second.

The evenness or uniform relation of the coils 84a and 84b to the closure due to the adjusted setting of the sensing device to any tilt of the package or deviation of the closure from a horizontal plane provides for a uniform relationship of the magnetic field to the top panels of the closures. This increases the sensitivity of the electronic component 106 due to the change in load produced by the fields of the eddy currents. Thus minor differences between a depressed cap and a raised cap may be readily detected.

It is thus seen from the foregoing description that a new closure inspecting device has been developed. The combination of a sliding bottom surface and a universal mounting accurately positions the sensing element in the same manner for each closure inspected. The mounting of the coils in a nonconductive material provides a sensitivity to small differences between the depressible top panel or portion of a closure and the sensing element. This means that slightly flexible top panels may be inspected as well as the more flexible panels. Even with the high sensitivity to small differences in the position of the top panel, the sensing element differentiates between the peripheral portion of a closure and raised top panels so that a signal is only created when the top panel is in the raised position as the closure passes beneath the sensing element for inspection.

Having thus described my invention, I claim:

1. Apparatus for inspecting packages having closures with depressible top panels comprising a sensing device having a support means and a sensing element, said support means having a bottom reference surface for engaging closures, said sensing element mounted in said support means in fixed relation to said bottom reference surface for detecting slight differences in the distance between said element and a depressible top panel of a closure under said sensing device, said sensing device having guide means for engaging closures and raising said sensing device to set said bottom reference surface on a closure moving under said sensing device, pivotal mounting means for supporting said sensing device to vertically pivot said sensing device and universally accommodate said fixedly related bottom reference surface and sensing element on closures successively moving under said sensing device for inspection of top panels by said sensing element.

2. Apparatus for inspecting packages having closures with depressible top panels comprising a sensing device having a support means and a sensing element, said support means having a bottom reference surface for engaging closures, said sensing element mounted in said support means in fixed relation to said bottom reference surface for detecting slight differences in the distance between said element and a depressible top panel of a closure under said sensing device, pivotal mounting means for supporting said sensing device to vertically pivot said sensing device and universally accommodate said fixedly related bottom reference surface and sensing element on closures successively moving under said sensing device for inspection of top panels by said sensing element, said mounting means including a first pivot means rotatably supporting said sensing device about a first axis and second pivot means rotatably supporting said mounting means about a second axis at right angles to said first axis to impart a universal movement to said sensing device.

3. Apparatus as set forth in claim 2 wherein said first pivot means and said sensing device have first means limiting the arc of movement about said first axis and said second pivot means have second means limiting the arc of movement about said second axis.

4. Apparatus for inspecting packages having closures with depressible top panels comprising a sensing device having a support means and a sensing element, said support means having a bottom reference surface for engaging closures, said sensing element mounted in said support means in fixed relation to said bottom reference surface for detecting slight differences in the distance between said element and a depressible top panel of a closure under said sensing device, said sensing element comprising a drive coil providing a high frequency alternating flux and a feed back coil inductively coupled with said drive coil and sensing differences in space of a closure from said coils by changes in loading pivotal mounting means for supporting said sensing device to vertically pivot said sensing device and universally accommodate said fixedly related bottom reference surface and sensing element on closures successively moving under said sensing device for inspection of top panels by said sensing element.

5. An apparatus as set forth in claim 4 wherein electronic means are provided connected to said drive coil and said feedback coil for providing a high frequency alternating current to said drive coil and said feedback coil inductively coupled with said drive coil and with closures positioned under said coils to vary the loading of said coils on said electronic means to produce a signal when the loading on said coils exceeds a given amount.

6. Apparatus for inspecting packages with closures having depressible top panels comprising electronic means producing a high frequency current and an actuating signal, a drive coil connected to said means to receive a high frequency current and produce a high frequency flux, a feedback coil connected to said electronic means and inductively coupled to said drive coil, said feedback and drive coils forming the sole inductive means connected to said electronic means and being inductively coupled with substantially the entire top panel of closures positioned under said coils to vary the loading of said coils on said electronic means, said electronic means producing an actuating signal at the signal output when the loading on said coils exceeds a given amount.

7. Apparatus as set forth in claim 6 wherein a casing of nonconductive material is provided for housing and supporting said feedback coil and said drive coil.

8. Apparatus as set forth in claim 6 wherein switching means and package rejection means are provided, said switching means being connected between said signal output and said rejection means for energization by an actuating signal to operate said rejection means to remove an unacceptable package.

9. Apparatus as set forth in claim 6 wherein the frequency of the flux is from about 16 to 24 kilocycles per second.

10. Apparatus for inspecting packages having closures with electrically conductive top panels comprising electronic means, drive and feedback coils connected to said electronic means with said feedback coil inductively coupled to said drive coil, a casing of nonconductive material housing and supporting said drive coil and feedback coil in inspecting relation to closures, said electronic means causing said drive coil to produce a high frequency flux for creating a response over said conductive panel, said feedback and drive coils forming the sole inductive means connected to said electronic means and being inductively coupled with substantially the entire panels of closures positioned under said coils and sensing the response of a panel to said flux to vary the loading of said coils on said electronic means, said electronic means producing an actuating signal for rejection of an unacceptable package when the loading by said coils exceeds a given amount.

11. Apparatus as set forth in claim 10 wherein the frequency of the flux is from about 16 to 24 kilocycles per second.

12. Apparatus for inspecting packages having closures with depressible top panels comprising a sensing device having a support means and a sensing element, said support means having a bottom reference surface for engaging closures, said sensing element mounted in said support means in fixed relation to said bottom reference surface for detecting slight differences in the distance between said element and a depressible top panel of a closure under said sensing device, pivotal mounting means for supporting said sensing device to vertically pivot said sensing device and universally accommodate said fixedly related bottom reference surface and sensing element on closures successively moving under said sensing device for inspection of top panels by said sensing element, said pivotal mounting means comprising a yoke member pivotally supporting said sensing device perpendicular to the movement of packages presented for inspection and pivot means extending longitudinal to the movement of packages for inspection providing a universal action of said sensing device for setting said bottom reference surface circumferentially on said closure at an angle to the horizontal.

13. An apparatus for inspecting packages having closures with depressible top panels comprising a sensing device having a support means and a sensing element, said support means having a bottom reference surface for engaging closures, all of said sensing device mounted in said support means above and in fixed relation to said bottom reference surface for detecting slight differences in the distance between said element and a depressible top panel of a closure under said sensing device, pivotal mounting means for supporting said sensing device to vertically pivot said sensing device and universally accommodate said fixedly related bottom reference surface and sensing element on closures successively moving under said sensing device for inspection of top panels by said sensing element.

14. An apparatus as set forth in claim 13 wherein said sensing element is an inductive means for creating a high frequency flux and said support means is made of an electrically nonconductive material.

15. An apparatus as set forth in claim 14 wherein the sensing element consists of a drive coil and a feedback coil.

References Cited
UNITED STATES PATENTS

| | | | |
|---|---|---|---|
| 3,206,027 | 9/1965 | Bailey. | |
| 3,392,829 | 7/1968 | Keinanen | 209—80 X |
| 3,064,807 | 11/1962 | Stover | 209—80 |
| 3,371,781 | 3/1968 | Armbruster et al. | 209—80 |

ALLEN N. KNOWLES, Primary Examiner

U.S. Cl. X.R.

324—47; 209—111.8